UNITED STATES PATENT OFFICE.

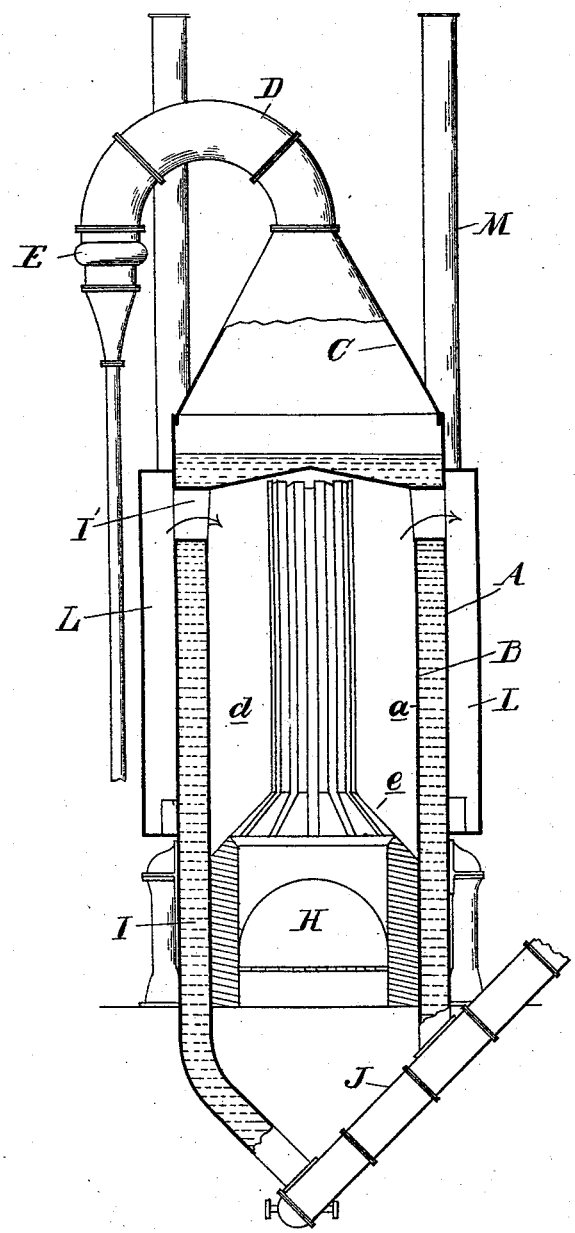

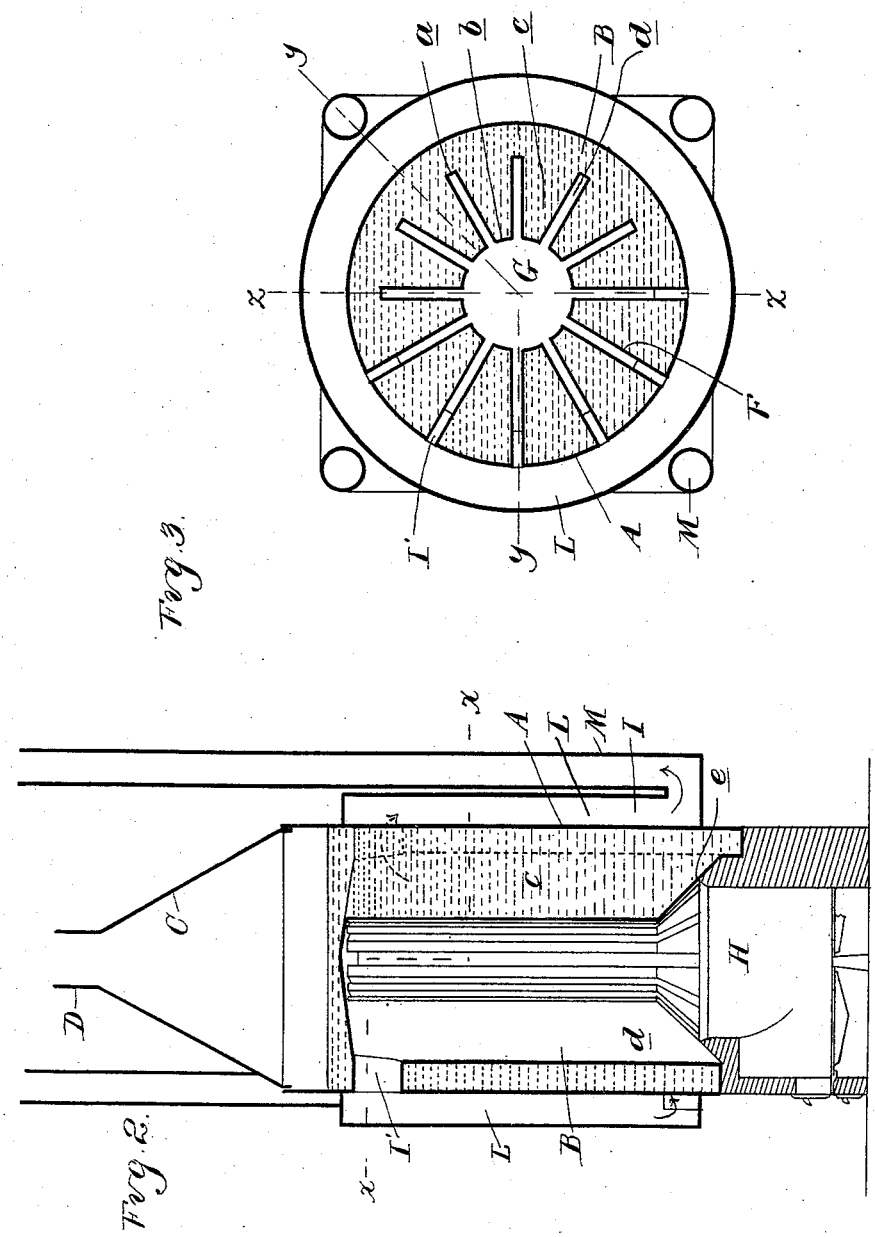

THOMAS CRANEY, OF BAY CITY, MICHIGAN.

EVAPORATING APPARATUS.

SPECIFICATION forming part of Letters Patent No. 572,333, dated December 1, 1896.

Application filed April 8, 1895. Serial No. 544,950. (No model.)

*To all whom it may concern:*

Be it known that I, THOMAS CRANEY, a citizen of the United States, residing at Bay City, in the county of Bay and State of Michigan, have invented certain new and useful Improvements in Evaporating Apparatus, of which the following is a specification, reference being had therein to the accompanying drawings.

This invention relates to an improvement in evaporating apparatus; and it consists in the construction and arrangement of parts hereinafter described, and definitely pointed out in the claim.

The object of the invention is to simplify the construction of such apparatus, to dispense with the use of the pipe-flues usually employed, and yet to obtain an efficient and economical device in operation and with practically no horizontal faces on which sediment can lodge.

The invention further consists in the construction, arrangement, and combination of the various parts, all as more fully hereinafter described.

In the drawings, Figure 1 is a vertical central section through such an apparatus embodying my invention. Fig. 2 is a similar section on line $y$ $y$, Fig. 3. Fig. 3 is a horizontal section on line $x$ $x$, Fig. 2.

A is a cylindrical casing forming the outer wall of the water-chamber B. This chamber at the top terminates in a tapering section C, which connects into a gooseneck-discharge D, in which is a suitable condenser E for condensing the vapors. The inner wall of this water-chamber is formed into a series of vertical flutings or folds, as shown in the drawings, by means of the radial division-walls F, connected at opposite ends by the connecting-walls $a$ $b$ to form in the inner face of the water-chamber the vertical fluid-channels $c$ and to form around the inner combustion-chamber G the vertical smoke-channels $d$, forming radial extensions of that combustion-chamber and communicating therewith their whole length.

At the bottom of the water-chamber is a furnace H, extending transversely beneath the same.

I are settling-legs formed on each side of the furnace by downward extensions of the water-chamber. These settling-legs connect, as usual, into the elevator-trunk J, in which is a suitable conveyer for carrying off the sediment as it is produced and settles into the legs.

At the bottom of the fluid-channels $c$ are the inclined bottom plates $e$, which overhang the furnace-chamber, as plainly shown in Fig. 2, so that the bottom of these channels are subjected directly to the heat of the furnace and so that the hot products of combustion will pass directly up into the smoke-flues between as well as through the interior combustion-chamber G.

At the top of the combustion-chamber I form through the water-chamber a series of lateral smoke-flues I', which connect into the top of the annular vertical flue L, formed on the outside of the water-chamber, and from the bottom of these flues I arrange the smoke-stacks M. Thus I obtain the heat on both the inner and outer walls of the water-chamber to obtain as great benefit as possible from the heat before letting it pass off through the stacks.

What I claim as my invention is—

In an evaporating apparatus, the combination with a furnace, of a boiler-section having an annular water-space the inner wall of which is formed into hollow separated radial wings arranged vertically and extending inward toward the vertical center of the boiler and forming between their sides and ends the combustion-chamber, a casing around the boiler forming a smoke-flue between the same and outer wall of the boiler, pipes leading from the combustion-chamber into the smoke-flue and a settling-leg below the furnace, substantially as described.

In testimony whereof I affix my signature in presence of two witnesses.

THOMAS CRANEY.

Witnesses:
   M. B. O'DOGHERTY,
   O. F. BARTHEL.